US012392297B1

(12) United States Patent
Ketterer et al.

(10) Patent No.: US 12,392,297 B1
(45) Date of Patent: Aug. 19, 2025

(54) EXHAUST GAS TEMPERATURE CONTROL

(71) Applicant: GM Global Technology Operations LLC, Detroit, MI (US)

(72) Inventors: Justin Edward Ketterer, LaSalle (CA); Andrew Michael Aerts, Royal Oak, MI (US); Robert S. McAlpine, Lake Orion, MI (US); Kenneth Briscoe, Commerce Township, MI (US); Kevin M. Luchansky, Bloomfield Hills, MI (US); Pratap Srinivasa Murthy, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/943,418

(22) Filed: Nov. 11, 2024

(51) Int. Cl.

| | |
|---|---|
| ***F02D 9/04*** | (2006.01) |
| ***F02B 37/00*** | (2006.01) |
| ***F02D 23/00*** | (2006.01) |
| ***F02D 41/00*** | (2006.01) |
| ***F02P 5/15*** | (2006.01) |

(52) U.S. Cl.
CPC ................ *F02D 9/04* (2013.01); *F02B 37/00* (2013.01); *F02D 23/00* (2013.01); *F02D 41/0047* (2013.01); *F02P 5/15* (2013.01)

(58) Field of Classification Search
CPC ........ F02D 9/04; F02D 23/00; F02D 41/0047; F02B 37/00; F02P 5/15
USPC ........................................................ 60/605.1
See application file for complete search history.

(56) References Cited

U.S. PATENT DOCUMENTS

| | | | | |
|---|---|---|---|---|
| 2006/0236692 | A1* | 10/2006 | Kolavennu | F02B 39/10 60/599 |
| 2007/0068156 | A1* | 3/2007 | Rottenkolber | F02D 41/0007 60/605.1 |
| 2014/0283502 | A1* | 9/2014 | Argolini | F02D 41/405 60/311 |
| 2015/0040859 | A1* | 2/2015 | Scavone | F02D 41/145 123/323 |
| 2021/0047974 | A1* | 2/2021 | Ferrara | F02B 37/18 |

* cited by examiner

*Primary Examiner* — Hoang M Nguyen
(74) *Attorney, Agent, or Firm* — Vivacqua Crane, PLLC

(57) ABSTRACT

A vehicle engine adapted to control exhaust gas temperature (EGT) at a catalyst inlet includes an EGT sensor in communication with a system controller and adapted to measure a temperature of exhaust gas at the catalyst inlet, the system controller adapted to compare the measured EGT to a target EGT, and, when the measured EGT is greater than the target EGT, limit gas exchange within a cylinder within the engine during an intake stroke, and increase turbine efficiency of a variable geometry turbocharger of the engine by increasing boost from the variable geometry turbocharger.

20 Claims, 5 Drawing Sheets

EXHAUST GAS TEMPERATURE CONTROL

INTRODUCTION

The present disclosure relates to an engine for a vehicle that is adapted to control exhaust gas temperature (EGT) at a catalyst inlet.

In an internal combustion engine exhaust gas from the cylinders within the engine are routed through a catalyst (catalytic converter) as the gases pass through an exhaust system. High EGT at the catalyst affects performance and durability of the catalyst.

Thus, while current systems and methods achieve their intended purpose, there is a need for a new and improved engine and method for controlling the temperature of exhaust gases from the engine.

SUMMARY

According to several aspects of the present disclosure, a method of controlling exhaust gas temperature within a vehicle engine includes measuring a temperature of exhaust gas (exhaust gas temperature, EGT) at a catalyst inlet with an EGT sensor in communication with a system controller, comparing, with the system controller, the measured EGT to a target EGT, and, when the measured EGT is greater than the target EGT, limiting, with the system controller, gas exchange within a cylinder within the engine during an intake stroke, and increasing, with the system controller, turbine efficiency of a variable geometry turbocharger of the engine by increasing boost from the turbocharger.

According to another aspect, the method further includes, when the measured EGT is less than the target EGT, adjusting, with the system controller, gas exchange during the intake stroke within the cylinder within the engine to increase the EGT.

According to another aspect, the method further includes, when the measured EGT is equal to the target EGT, one of maintaining, with the system controller, current gas exchange calibration within the cylinder, or, limiting, with the system controller, gas exchange within the cylinder during the intake stroke, and increasing, with the system controller, turbine efficiency of the variable geometry turbocharger of the engine by increasing boost from the turbocharger.

According to another aspect, the limiting, with the system controller, gas exchange within the cylinder during the intake stroke further includes advancing, with the system controller, a closing of an intake valve for the cylinder during the intake stroke and reducing a volume of an air fuel mixture received within the cylinder during the intake stroke.

According to another aspect, the advancing, with the system controller, the closing of the intake valve for the cylinder during the intake stroke further includes, adjusting, with a cam phaser in communication with the system controller, timing of an intake camshaft associated with the intake valve.

According to another aspect, the adjusting, with the cam phaser, timing of the intake cam associated with the intake valve further includes adjusting, with the cam phaser, timing of a short duration intake camshaft associated with the intake valve.

According to another aspect, the method further includes adjusting spark timing based on advancement of the closing of the intake valve.

According to another aspect, the increasing, with the system controller, boost from the variable geometry turbocharger further includes adjusting, with the system controller, an angle of each one of a plurality of movable vanes around the turbine that are in communication with the system controller and are adapted to control the exhaust gas flow through the turbine of the variable geometry turbocharger.

According to another aspect, the increasing boost from the variable geometry turbocharger further includes directing all of the exhaust gas from the engine through the turbine of the variable geometry turbocharger.

According to another aspect, the increasing boost from the variable geometry turbocharger further includes increasing enthalpy extraction from exhaust gas that is routed through the turbine of the variable geometry turbocharger.

According to several aspects of the present disclosure, a vehicle engine adapted to control exhaust gas temperature (EGT) at a catalyst inlet includes an EGT sensor in communication with a system controller and adapted to measure a temperature of exhaust gas at the catalyst inlet, the system controller adapted to compare the measured EGT to a target EGT, and, when the measured EGT is greater than the target EGT, limit gas exchange within a cylinder within the engine during an intake stroke, and increase turbine efficiency of a variable geometry turbocharger of the engine by increasing boost from the variable geometry turbocharger.

According to another aspect, when the measured EGT is less than the target EGT, the system controller is adapted to adjust gas exchange during the intake stroke within the cylinder within the engine to increase the EGT.

According to another aspect, when the measured EGT is equal to the target EGT, the system controller is adapted to one of maintain current gas exchange calibration within the cylinder, or limit gas exchange within the cylinder during the intake stroke, and increase turbine efficiency of the variable geometry turbocharger of the engine by increasing boost from the variable geometry turbocharger.

According to another aspect, when limiting gas exchange within the cylinder during the intake stroke, the system controller is further adapted to advance a closing of an intake valve for the cylinder during the intake stroke and reduce a volume of an air fuel mixture received within the cylinder during the intake stroke.

According to another aspect, when advancing the closing of the intake valve for the cylinder during the intake stroke, the system controller is further adapted to actuate a cam phaser in communication with the system controller, and adapted to adjust timing of an intake camshaft associated with the intake valve.

According to another aspect, the intake camshaft associated with the intake valve is a short duration intake cam.

According to another aspect, the system controller is further adapted to adjust spark timing within the cylinder based on advancement of the closing of the intake valve.

According to another aspect, the variable geometry turbocharger includes a turbine having a plurality of movable vanes adapted to direct exhaust gas flow through the turbine, the system controller adapted to selectively adjust an angle of each one of the plurality of movable vanes to increase boost from the variable geometry turbocharger.

According to another aspect, all of the exhaust gas from the engine is directed through the turbine of the variable geometry turbocharger, increasing boost from the variable geometry turbocharger and increasing enthalpy extraction from exhaust gas that is routed through the turbine of the variable geometry turbocharger.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
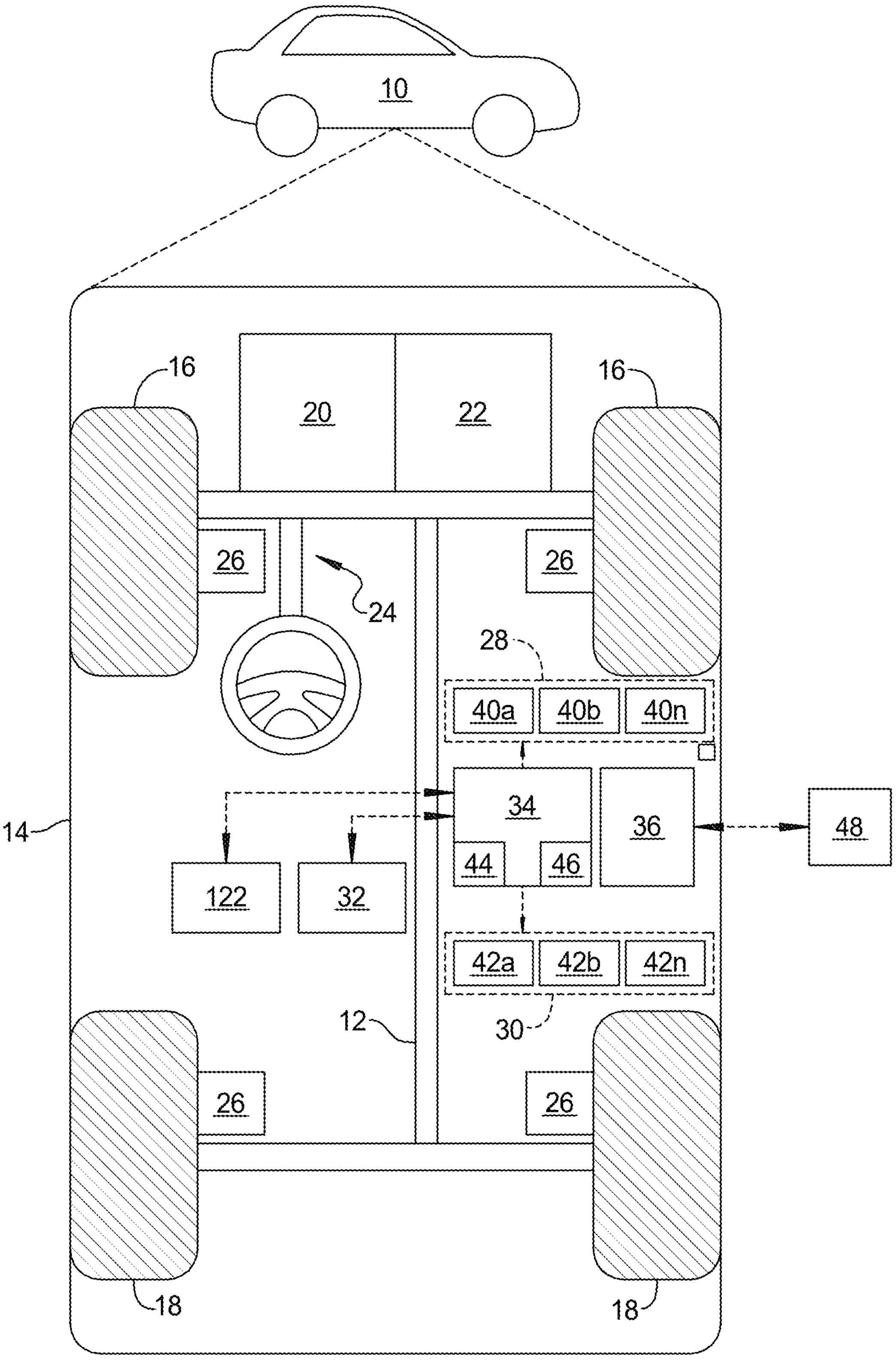
FIG. 1 is a perspective view of vehicle having an engine according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: 4 (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an internal combustion engine 20 adapted to control exhaust gas temperature (EGT) at a catalyst inlet 50. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human user does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes the internal combustion engine 20, a transmission system 22, a steering system 24, a brake system 26, a sensor system 28, an actuator system 30, at least one data storage device 32, a vehicle controller 34, and a wireless communication module 36. The transmission system 22 is configured to transmit power from the engine 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40_a_-40_n_ that sense observable conditions of the exterior environment and/or the interior environment of the autonomous vehicle 10. The sensing devices 40_a_-40_n_ can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40_a_-40_n_ is used to determine information about an environment surrounding the vehicle 10. In an exemplary embodiment, the plurality of sensing devices 40_a_-40_n_ includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices

40*a*-40*n* further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40*a*-40*n* is capable of measuring distances in the environment surrounding the vehicle 10.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
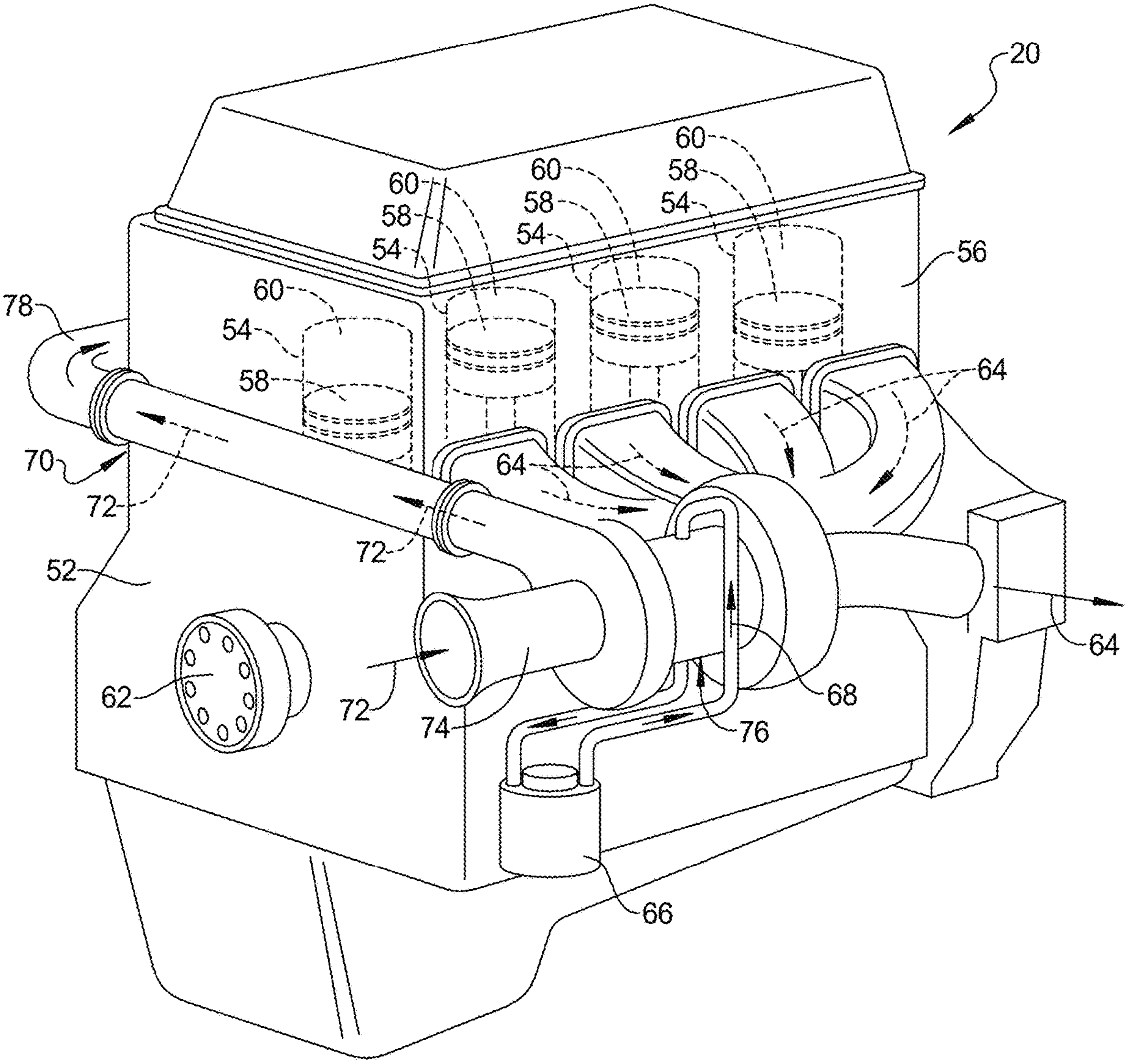
FIG. 2 is a schematic view of the internal combustion engine of the vehicle shown in FIG. 1.
Figure 3:
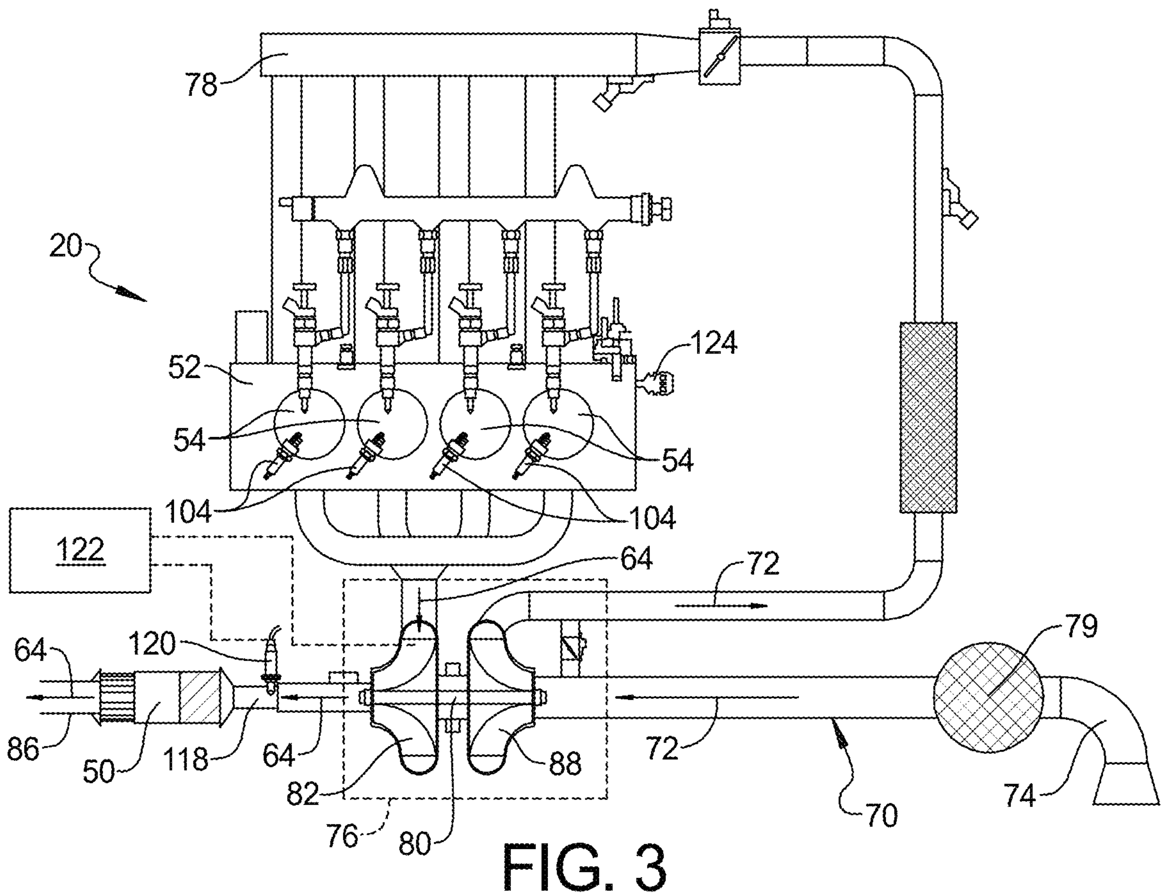
FIG. 3 is a schematic view of the internal combustion engine shown in FIG. 2 illustrating details of a variable geometry turbocharger.

Referring to FIG. 2 and FIG. 3, the internal combustion engine 20 includes a cylinder block 52 with a plurality of cylinders 54 arranged therein. As shown, the engine 20 also includes a cylinder head 56. Each cylinder 54 includes a piston 58 configured to reciprocate therein. Combustion chambers 60 are formed within the cylinders 54 between the bottom surface of the cylinder head 56 and the tops of the pistons 58. As known by those skilled in the art, combustion chambers 60 are configured to receive a fuel-air mixture for subsequent combustion therein.

The engine 20 also includes a crankshaft 62 configured to rotate within the cylinder block 52. The crankshaft 62 is rotated by the pistons 58 as a result of an appropriately proportioned fuel-air mixture being burned in the combustion chambers 60. After the air-fuel mixture is burned inside a specific combustion chamber 60, the reciprocating motion of a particular piston 58 serves to exhaust post-combustion gases 64 from the respective cylinder 54. The engine 20 also includes a fluid pump 66. The fluid pump 66 is configured to supply a lubricating fluid 68, such as engine oil. Accordingly, the fluid pump 66 may supply the lubricating fluid 68 to various bearings, such as that of the crankshaft 62. The fluid pump 66 may be driven directly by the engine 20, or by an electric motor (not shown).

The engine 20 additionally includes an induction system 70 configured to channel airflow 72 from the ambient to the cylinders 54. The induction system 70 includes an intake air duct 74, a variable geometry turbocharger 76, and an intake manifold 78. The induction system 70 may additionally include an air filter 79 upstream of the variable geometry turbocharger 76 for removing foreign particles and other airborne debris from the airflow 72. The intake air duct 74 is configured to channel the airflow 72 from the ambient to the variable geometry turbocharger 76, while the variable geometry turbocharger 76 is configured to pressurize the received airflow, and discharge the pressurized airflow to the intake manifold 78. The intake manifold 78, in turn, distributes the previously pressurized airflow 72 to the cylinders 54 for mixing with an appropriate amount of fuel and subsequent combustion of the resultant fuel-air mixture. It should be understood by those skilled in the art that the novel features of the present disclosure are also applicable to engines using port injection or combined direct/port injected systems.

The variable geometry turbocharger 76 includes a shaft 80 having a first end and a second end. A turbine 82 is mounted on the shaft 80 proximate to the first end and configured to be rotated along with the shaft 80 about an axis by post-combustion gases 64 emitted from the cylinders 54. The turbine 82 is positioned within a housing 84 wherein exhaust gases 64 from the engine 20 enter the housing 84, pass through the turbine 82 and flow to a catalyst 50 (catalytic converter) and then out through an exhaust pipe 86 of the vehicle 10. The variable geometry turbocharger 76 also includes a compressor wheel 88 mounted on the shaft 80 proximate to the second end. The compressor wheel 88 is driven by rotation of the turbine via the shaft 80 due to flow of exhaust gases 64 imparting rotation to the turbine 82. The compressor wheel 88 is configured to pressurize the airflow 72 being received from the ambient for eventual delivery to the cylinders 54. Accordingly, rotation is imparted to the shaft 80 by the post-combustion exhaust gases 64 energizing the turbine 82, and is, in turn, communicated to the compressor wheel 88 owing to the compressor wheel 88 being fixed on the shaft 80. As understood by those skilled in the art, the variable flow and force of the post-combustion exhaust gases 64 influences the amount of boost pressure that may be generated by the compressor wheel 88 throughout the operating range of the engine 20.

Figure 4A:
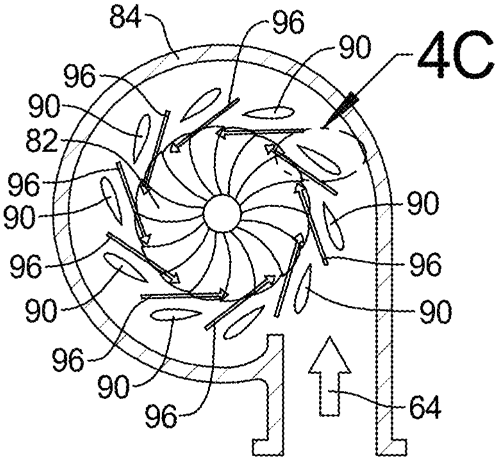
FIG. 4A is a side sectional schematic view of an turbine of the variable geometry turbocharger, wherein movable vanes are relatively closed, providing low exhaust flow to the turbine blades.
Figure 4B:
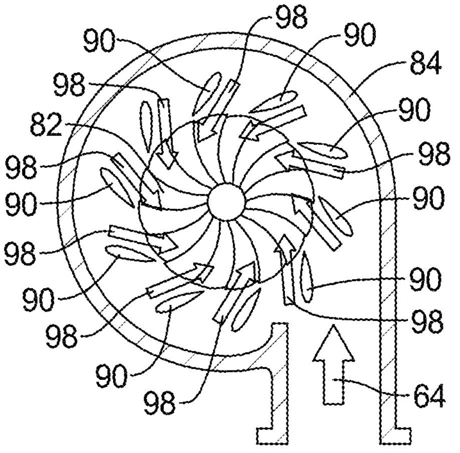
FIG. 4B is a side sectional schematic view similar to FIG. 4A, wherein the moveable vanes are relatively open, providing higher exhaust flow to the turbine blades.
Figure 4C:
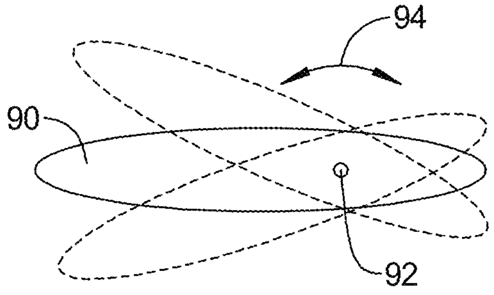
FIG. 4C is an enlarged view of a movable vane of the turbine as indicated by the circled area labelled "FIG. 4C" in FIG. 4A.

Referring to FIG. 4A, FIG. 4B and FIG. 4C, in an exemplary embodiment, the turbine 82 of the variable geometry turbocharger 76 includes a plurality of movable vanes 90 which selectively control the flow of exhaust gases through the turbine 82. The plurality of movable vanes 90 rotate individually about their own axis 92, as indicated by arrow 94, wherein the vanes 90 can be in a more "open" position or a more "closed" position. Referring to FIG. 3A, the plurality of movable vanes 90 can be moved to a relatively "closed" position, wherein the flow of exhaust gases is moderately directed to the turbine 82, as indicated by arrows 96, thus influencing enthalpy delivery to the turbine 82 at lower exhaust mass flow rates and associated power delivered to the compressor wheel 88-to achieve the target boost pressure. Alternatively, referring to FIG. 3B, the plurality of movable vanes 90 can be moved to a relatively "open" position, wherein the flow of exhaust gases is aggressively directed to the turbine 82, as indicated by arrows 98, thus influencing enthalpy delivery to the turbine 82 at higher exhaust mass flow rates and associated power delivered to the a compressor wheel 88 to achieve the target boost pressure.

Figure 5:
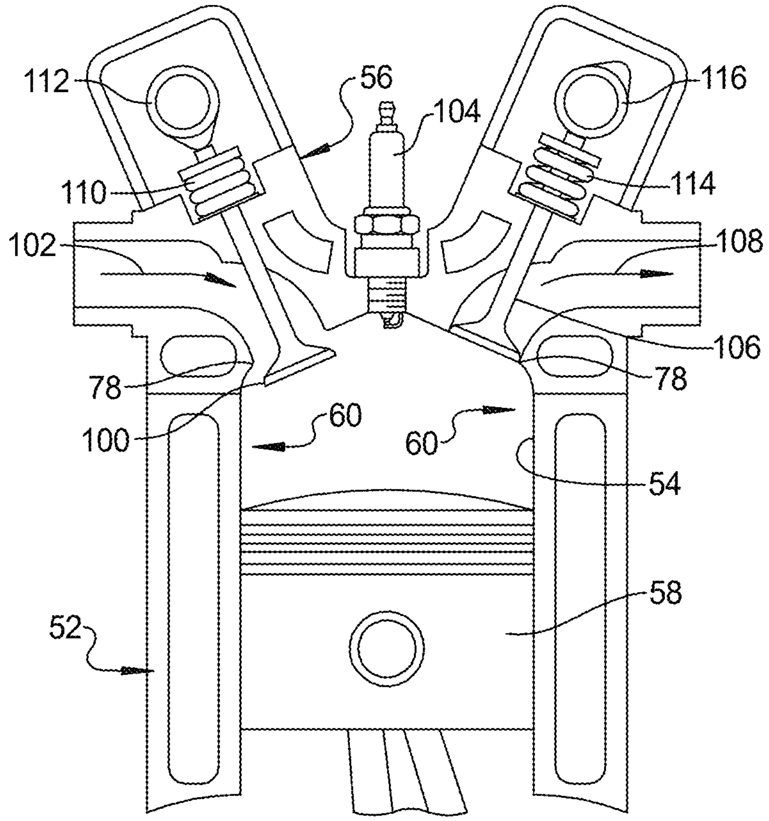
FIG. 5 is a side sectional view of a cylinder of the engine shown in FIG. 1, FIG. 2 and FIG. 3.

Referring to FIG. 5, the only way for air and fuel to enter and leave the combustion chamber 60 is through valves 100, 106. An intake valve 100 opens and allows fuel and air to enter the combustion chamber 60, as indicated by arrow 102. After fuel and air enter the combustion chamber 60, the intake valve 100 closes, sealing the combustion chamber 60. A spark plug 104 ignites the air fuel mixture within the combustion chamber 60. After combustion, an exhaust valve 106 opens and allows exhaust gases to exit from the combustion chamber 60, as indicated by arrow 108. A first spring 110 and an intake cam shaft 112 control the opening and closing of the intake valve 100 and a second spring 114 and an exhaust cam shaft 116 control the opening and closing of the exhaust valve 106 during operation of the engine 20.

In an exemplary embodiment, the vehicle engine 20 is adapted to control exhaust gas temperature (EGT) at an inlet 118 to the catalyst 50. The engine 20 includes an EGT sensor 120 in communication with a system controller 122 that is adapted to measure a temperature of exhaust gas at the inlet 118 to the catalyst 50.

The system controller 122 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The system controller 122 may be the vehicle controller 34, or alternatively, the system controller 122 may be a separate controller in communication with the vehicle controller 34 and dedicated to controlling engine related functions.

The system controller 122 is adapted to receive a temperature of the exhaust gas at the inlet 118 to the catalyst 50 from the EGT sensor 120 which is positioned at the inlet 118 to the catalyst 50 and compare the measured EGT to a target EGT. In an exemplary embodiment, the system controller 122 utilizes models of temperature response to engine operating conditions to predict the temperature of the exhaust gas at the inlet 118 to the catalyst 50. The target EGT is a pre-determined temperature at which the engine 20 and related systems are functioning optimally and a temperature that will not cause undue deterioration or damage to the catalyst 50.

When the measured EGT is greater than the target EGT, the system controller 122 is adapted to limit gas exchange within a cylinder 54 within the engine 20 during an intake stroke, and to increase turbine efficiency of the variable geometry turbocharger 76 of the engine 20 by increasing boost from the turbocharger 76. During the intake stroke, the exhaust valve 106 of the cylinder 54 is closed, and the intake valve 100 of the cylinder 54 is open allowing air and fuel to enter the combustion chamber 60 of the cylinder 54. For purposes of description herein, the actions of the system controller 122 when limiting gas exchange will be described in relation to "a cylinder 54", singularly. It should be appreciated by those skilled in the art that limiting gas exchange may be applied to all or any portion of the plurality of cylinders 54 within the engine 20.

In an exemplary embodiment, when limiting gas exchange within the cylinder 54 during the intake stroke, the system controller 122 is further adapted to advance a closing of the intake valve 100 for the cylinder 54 during the intake stroke, thereby reducing a volume of the air fuel mixture received within the cylinder 54 during the intake stroke. The intake valve 100 may comprise a single intake valve, or, as in some configurations, each cylinder 54 may include two individual intake valves, acting in concert to allow air and fuel to enter the cylinder 54 during the intake stroke. For purposes of discussion herein, the engine 20 will be described as having a single intake valve 100 per cylinder 54. It should be understood that the novel features of the present disclosure would also apply to dual intake valve configurations, wherein the timing of one or both of two intake valves is altered to reduce the volume of the air fuel mixture received within the cylinder 54 during the intake stroke. The closing of the intake valve 100 is advanced by actuating an cam phaser 124 that is in communication with the system controller 122. The cam phaser 124 is adapted to act upon the intake camshaft 112 to change the position of the intake camshaft 112 and alter the timing of the opening and closing of the intake valve 100. The cam phaser can advance (open or close sooner) or retard (open or close later) the timing of the opening and closing of the intake valve 100. In an exemplary embodiment, the cam phaser 124 is an electronically actuated ePhaser. In another exemplary embodiment, the cam phaser 124 is a hydraulically actuated cam phaser. It should be understood by those skilled in the art that any type of cam phaser 124 may be used to alter the timing of the opening and closing of the intake valve 100 within the scope of the novel features of the present disclosure.

Closing the intake valve 100 early to limit gas exchange within the cylinder 54 is known as Early Intake Valve Closure (EIVC). In an exemplary embodiment, the intake camshaft 112 is a short duration intake camshaft. Duration is simply the number of crankshaft 62 degrees that a valve is off its seat (held open). An air/fuel charge enters or exhaust gases exit the cylinder 54 whenever a valve 100, 106 is open. In general the longer a valve 100, 106 is open the higher the engine 20 can revolve (revolutions per minute, RPM). The higher the duration the longer the valves 100, 106 are held open affecting both the power band and driveability. Lower duration boosts low-end torque which results in better idle quality but sacrifices top-end power. Short duration cams also limit valve lift due to rate-of-lift limits of the lifter. Shorter duration enables EIVC.

In an exemplary embodiment, the system controller 122 is further adapted to adjust spark timing within the cylinder 54 based on advancement of the closing of the intake valve 100. Ignition timing (spark from the spark plug 104) generally advances during light-load operation to a maximum braking torque (MBT) timing. At higher loads the ignition timing is retarded to prevent knock. The ignition timing may also be retarded when the engine is cold, working in conjunction with late fuel injection and earlier exhaust-valve opening to bring the catalytic converter (catalyst 50) to operating temperature more quickly. EIVC changes the optimal timing of ignition, and thus, in conjunction with EIVC the spark timing may be adjusted accordingly.

Closing the intake valve 100 early limits cylinder 54 filling, as part of the intake stroke is not able to displace fresh charge. This limits the volumetric efficiency of the gas exchange. To overcome the low volumetric efficiency and maintain constant engine load, increased boost is needed from the variable geometry turbocharger 76. Increased boost requires more shaft 80 work to drive the compressor wheel 88. The increased work is achieved via increased enthalpy extraction from the exhaust gas stream. The drop in enthalpy in the exhaust stream lowers the exhaust temperature. Thus, increasing boost from the variable geometry turbocharger 76 along with varying the intake valve closure timing (EIVC) can be used to control exhaust gas temperature.

In an exemplary embodiment, the system controller 122 is adapted to selectively adjust an angle of each one of the plurality of movable vanes 90 to increase boost from the variable geometry turbocharger. The variable geometry turbocharger 76 of the present disclosure does not include a wastegate, thus, all (100%) of the exhaust gases are directed through the turbine 82 of the variable geometry turbocharger 76, increasing boost from the variable geometry turbocharger 76 and increasing enthalpy extraction from exhaust gas that is routed through the turbine 82 of the variable geometry turbocharger 76.

The variable geometry turbocharger 76 allows increased boost, widening the range of exhaust gas temperature control. The variable geometry turbocharger 76 varies the turbine efficiency, providing a further control parameter for temperature control as it allows variable enthalpy extraction from the exhaust gas stream directly. The design of the variable geometry turbocharger 76 results in the full exhaust flow stream being directed through the turbine 82, maximizing enthalpy extraction, but also ensuring the exhaust gases are well mixed, avoiding the potential for a hot spot on the catalyst 50 face due to stratification. In addition to the volumetric efficiency effect of early intake valve closure, this process results in a reduced effective compression ratio. This reduces the knock sensitivity of the engine combustion system, allowing earlier combustion phasing, which increases the effective expansion, extracting more work in the expansion stroke, and consequently, yielding a lower temperature at the end of the cycle. Thus, increasing the efficiency (providing more boost) at the variable geometry turbocharger 76 enables usage of EIVC to reduce exhaust gas temperatures and provides an additional control parameter to provide further lowering of exhaust gas temperatures. The result is control over exhaust temperature over a wide range, along with a higher maximum ability to extract enthalpy from the exhaust stream (as shaft 80 work), allowing an improved reduction in exhaust gas temperature when needed.

In another exemplary embodiment, when the measured EGT is less than the target EGT, the system controller 122 is adapted to adjust gas exchange during the intake stroke within the cylinder 54 within the engine 20 to increase the EGT. Optimally, the exhaust gas temperature is equal to the target EGT. In some cases, the target EGT is defined by an upper target EGT and a lower target EGT, defining a window or range for the target EGT. Thus, as described above, if the measured EGT is greater than the target EGT, or falls outside/above the target EGT range (above the upper target EGT), then the system controller 122 will lower the EGT with EIVC and increased boost from the variable geometry turbocharger 76. Further, if the measured EGT is less than the target EGT, or falls outside/below the target EGT range (below the lower target EGT), then the system controller 122 will increase the EGT by adjusting (advancing/retarding) the timing of the intake valve 100 closing and adjusting boost from the variable geometry turbocharger 76 to increase the EGT.

In another exemplary embodiment, when the measured EGT is equal to the target EGT (falls within the range of the target EGT), the system controller is adapted to either 1) maintain current gas exchange calibration within the cylinder 54, or 2) limit gas exchange within the cylinder 54 during the intake stroke, and increase turbine efficiency of the variable geometry turbocharger 76 of the engine 20 by increasing boost from the variable geometry turbocharger 76. Even when the measured EGT is equal to the target EGT (within the range of the target EGT), under certain operating conditions it may be desirable to reduce the temperature of the exhaust gases, thus, the system controller may keep current calibration, maintaining the EGT, or take steps to lower the EGT, depending on current operating conditions of the engine 20.

Figure 6:
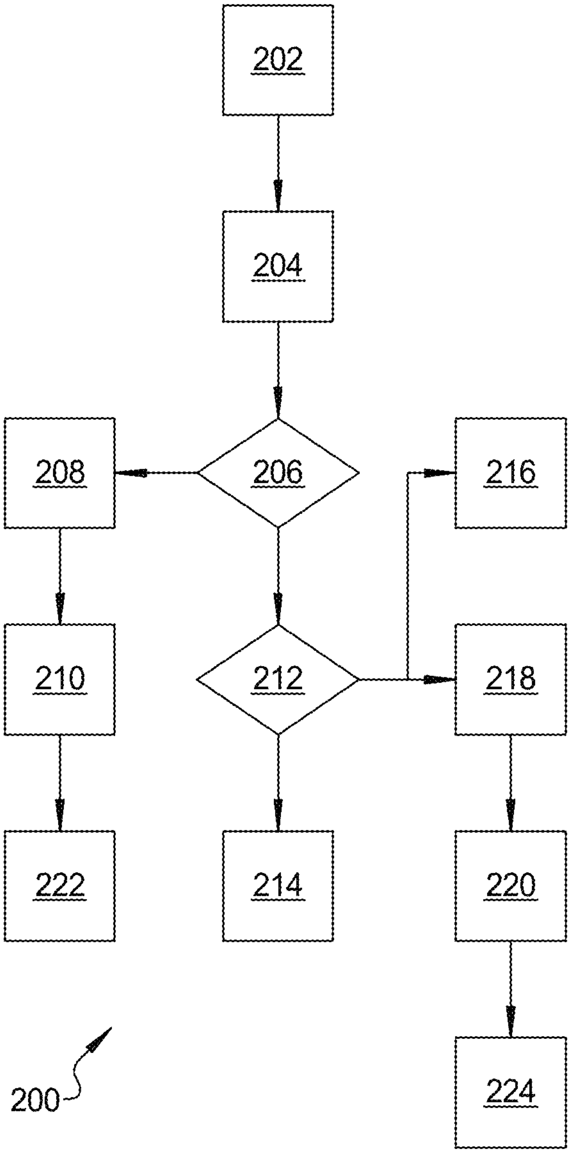
FIG. 6 is a flow chart illustrating a method according to an exemplary embodiment of the present disclosure.

Referring to FIG. 6, a method 200 of controlling exhaust gas temperature within a vehicle engine 20 includes, starting at block 202, measuring a temperature of exhaust gas (exhaust gas temperature, EGT) at a catalyst inlet 118 with an EGT sensor 120 in communication with a system controller 122, moving to block 204, comparing, with the system controller 122, the measured EGT to a target EGT or target EGT range, and, moving to block 206, when the measured EGT is greater than the target EGT (higher than an upper target EGT), moving to block 208, limiting, with the system controller 122, gas exchange within a cylinder 54 within the engine 20 during an intake stroke, and, moving to block 210, increasing, with the system controller 122, turbine efficiency of a variable geometry turbocharger 76 of the engine 20 by increasing boost from the variable geometry turbocharger 76.

In an exemplary embodiment, when, at block 206, the measured EGT is not greater than the target EGT (higher than an upper target EGT), moving to block 212, when the measured EGT is less than the target EGT (below a lower target EGT), the method 200 includes, moving to block 214, adjusting, with the system controller 122, gas exchange during the intake stroke within the cylinder 54 within the engine 20 to increase the EGT.

In an exemplary embodiment, when, at block 212, the measured EGT is not less than the target EGT (measured EGT equals target EGT or falls within target EGT range), then the method 200 includes one of, moving from block 212 to block 216, maintaining, with the system controller 122, current gas exchange calibration within the cylinder 54, or, moving from block 212 to block 218, limiting, with the system controller 122, gas exchange within the cylinder 54 during the intake stroke, and, moving to block 220, increasing, with the system controller 122, turbine efficiency of the variable geometry turbocharger 76 of the engine 20 by increasing boost from the variable geometry turbocharger 76.

In another exemplary embodiment, the limiting, with the system controller 122, gas exchange within the cylinder 54 during the intake stroke at blocks 208 and 218 further includes advancing, with the system controller 122, a closing of an intake valve 100 for the cylinder 54 during the intake stroke and reducing a volume of an air fuel mixture received within the cylinder 54 during the intake stroke.

In another exemplary embodiment, the advancing, with the system controller 122, the closing of the intake valve 100 for the cylinder 54 during the intake stroke at blocks 208 and 218 further includes, adjusting, with a cam phaser 124 in communication with the system controller 122, timing of an intake camshaft 112 associated with the intake valve 100.

In another exemplary embodiment, the adjusting, with the cam phaser 124, timing of the intake camshaft 112 associated with the intake valve 100 at blocks 208 and 218 further includes adjusting, with the cam phaser 124, timing of a short duration intake camshaft 112 associated with the intake valve 100.

In another exemplary embodiment, after limiting, with the system controller 122, gas exchange within a cylinder 54 within the engine 20 during an intake stroke at block 208, and increasing, with the system controller 122, turbine efficiency of a variable geometry turbocharger 76 of the engine 20 by increasing boost from the variable geometry turbocharger 76 at block 210, the method 200 further includes, moving to block 222, adjusting spark timing based on advancement of the closing of the intake valve 100, and after limiting, with the system controller 122, gas exchange within a cylinder 54 within the engine 20 during an intake stroke at block 218, and increasing, with the system controller 122, turbine efficiency of a variable geometry turbocharger 76 of the engine 20 by increasing boost from the variable geometry turbocharger 76 at block 220, the method 200 further includes, moving to block 224, adjusting spark timing based on advancement of the closing of the intake valve 100.

In another exemplary embodiment, the increasing, with the system controller 122, boost from the variable geometry turbocharger 76 at blocks 210 and 220 further includes adjusting, with the system controller 122, an angle of each one of a plurality of movable vanes 90 within an turbine 82 that are in communication with the system controller 122 and are adapted to direct exhaust gas flow through the turbine 82 of the variable geometry turbocharger 76.

In another exemplary embodiment, the increasing boost from the variable geometry turbocharger 76 at blocks 210 and 220 further includes directing all of the exhaust gas from the engine 20 through the turbine 82 of the variable geometry turbocharger 76.

In another exemplary embodiment, the increasing boost from the variable geometry turbocharger 76 at block 210 and 220 further includes increasing enthalpy extraction from exhaust gas that is routed through the turbine 82 of the variable geometry turbocharger 76.

The engine 20 and method 200 of the present disclosure provides benefits including, but not limited to, improved robustness of exhaust system components by limiting exposure to high temperature exhaust gases, and improved emissions control by limiting catalyst 50 aging and allowing reduced emissions with the same or less active catalytic material. Using EIVC eliminates cam profile switching over most of the operating map of the engine 20, reducing calibration complexity, and the added control of exhaust gas temperature offers improved means of limiting exhaust temperature under heavily-loaded conditions (e.g. towing), which may allow the use of less enrichment for component protection, with emissions and fuel consumption benefits. The variable geometry turbocharger 76 enables higher power output from the engine 20, simultaneously with improved emissions and improves flow distribution to the catalyst 50, further improving catalyst 50 temperature uniformity and reducing wetted area of the variable geometry turbocharger 76 versus dual volute turbochargers, and also providing lower mass, and increased enthalpy for catalyst 50 heating.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of controlling exhaust gas temperature within a vehicle engine, comprising:

measuring an exhaust gas temperature (EGT) at a catalyst inlet with an EGT sensor in communication with a system controller;

comparing, with the system controller, the measured EGT to a target EGT; and when the measured EGT is greater than the target EGT:

limiting, with the system controller, gas exchange within a cylinder within the engine during an intake stroke; and increasing, with the system controller, turbine efficiency of a variable geometry turbocharger of the engine by increasing boost from the turbocharger.

2. The method of claim 1, further including, when the measured EGT is less than the target EGT, adjusting, with the system controller, gas exchange during the intake stroke within the cylinder within the engine to increase the EGT.

3. The method of claim 2, further including, when the measured EGT is equal to the target EGT, one of:
maintaining, with the system controller, current gas exchange calibration within the cylinder; or
limiting, with the system controller, gas exchange within the cylinder during the intake stroke; and
increasing, with the system controller, turbine efficiency of the variable geometry turbocharger of the engine by increasing boost from the turbocharger.

4. The method of claim 3, wherein the limiting, with the system controller, gas exchange within the cylinder during the intake stroke further includes advancing, with the system controller, a closing of an intake valve for the cylinder during the intake stroke and reducing a volume of an air fuel mixture received within the cylinder during the intake stroke.

5. The method of claim 4, wherein the advancing, with the system controller, the closing of the intake valve for the cylinder during the intake stroke further includes, adjusting, with a cam phaser in communication with the system controller, timing of an intake camshaft associated with the intake valve.

6. The method of claim 5, wherein the adjusting, with the cam phaser, timing of the intake cam associated with the intake valve further includes adjusting, with the cam phaser, timing of a short duration intake camshaft associated with the intake valve.

7. The method of claim 4 further including adjusting spark timing based on advancement of the closing of the intake valve.

8. The method of claim 4, wherein the increasing, with the system controller, boost from the variable geometry turbocharger further includes adjusting, with the system controller, an angle of each one of a plurality of movable vanes around the turbine that are in communication with the system controller and are adapted to control the exhaust gas flow through the turbine of the variable geometry turbocharger.

9. The method of claim 8, wherein the increasing boost from the variable geometry turbocharger further includes directing all of the exhaust gas from the engine through the turbine of the variable geometry turbocharger.

10. The method of claim 9, wherein the increasing boost from the variable geometry turbocharger further includes increasing enthalpy extraction from exhaust gas that is routed through the turbine of the variable geometry turbocharger.

11. A vehicle engine adapted to control exhaust gas temperature (EGT) at a catalyst inlet, comprising:
an EGT sensor in communication with a system controller and adapted to measure a temperature of exhaust gas at the catalyst inlet;
the system controller adapted to:
compare the measured EGT to a target EGT; and
when the measured EGT is greater than the target EGT:
limit gas exchange within a cylinder within the engine during an intake stroke; and
increase turbine efficiency of a variable geometry turbocharger of the engine by increasing boost from the variable geometry turbocharger.

12. The vehicle engine of claim 11, wherein, when the measured EGT is less than the target EGT, the system controller is adapted to adjust gas exchange during the intake stroke within the cylinder within the engine to increase the EGT.

13. The vehicle engine of claim 12, wherein, when the measured EGT is equal to the target EGT, the system controller is adapted to one of:
maintain current gas exchange calibration within the cylinder; or
limit gas exchange within the cylinder during the intake stroke; and
increase turbine efficiency of the variable geometry turbocharger of the engine by increasing boost from the variable geometry turbocharger.

14. The vehicle engine of claim 13, wherein, when limiting gas exchange within the cylinder during the intake stroke, the system controller is further adapted to advance a closing of an intake valve for the cylinder during the intake stroke and reduce a volume of an air fuel mixture received within the cylinder during the intake stroke.

15. The vehicle engine of claim 14, wherein, when advancing the closing of the intake valve for the cylinder during the intake stroke, the system controller is further adapted to actuate a cam phaser in communication with the system controller, and adapted to adjust timing of an intake camshaft associated with the intake valve.

16. The vehicle engine of claim 15, wherein, the intake camshaft associated with the intake valve is a short duration intake cam.

17. The vehicle engine of claim 14, wherein the system controller is further adapted to adjust spark timing within the cylinder based on advancement of the closing of the intake valve.

18. The vehicle engine of claim 14, wherein the variable geometry turbocharger includes a turbine having a plurality of movable vanes adapted to direct exhaust gas flow through the turbine, the system controller adapted to selectively adjust an angle of each one of the plurality of movable vanes to increase boost from the variable geometry turbocharger.

19. The vehicle engine of claim 18, wherein all of the exhaust gas from the engine is directed through the turbine of the variable geometry turbocharger, increasing boost from the variable geometry turbocharger and increasing enthalpy extraction from exhaust gas that is routed through the turbine of the variable geometry turbocharger.

20. A vehicle having an engine that is adapted to control exhaust gas temperature (EGT) at a catalyst inlet, comprising:
an EGT sensor in communication with a system controller and adapted to measure a temperature of exhaust gas at the catalyst inlet;
the system controller adapted to:
compare the measured EGT to a target EGT; and
when the measured EGT is greater than the target EGT:
actuate a cam phaser in communication with the system controller, and adapted to adjust timing of a short duration intake camshaft associated with the intake valve to advance a closing of an intake valve for the cylinder during an intake stroke and reduce a volume of an air fuel mixture received within the cylinder during the intake stroke;
adjust spark timing within the cylinder based on advancement of the closing of the intake valve; and
selectively adjust an angle of each one of a plurality of movable vanes positioned within an turbine of the variable geometry turbocharger and adapted to direct exhaust gas flow through the turbine to increase boost from the variable geometry turbocharger;

when the measured EGT is less than the target EGT, adjust gas exchange during the intake stroke within the cylinder within the engine to increase the EGT; and when the measured EGT is equal to the target EGT, one of:

maintain current gas exchange calibration within the cylinder; or actuate an ePhaser in communication with the system controller, and adapted to adjust timing of a short duration intake cam associated with the intake valve to advance a closing of an intake valve for the cylinder during an intake stroke and reduce a volume of an air fuel mixture received within the cylinder during the intake stroke;

adjust spark timing within the cylinder based on advancement of the closing of the intake valve; and selectively adjust an angle of each one of a plurality of movable vanes positioned within an turbine of the variable geometry turbocharger and adapted to direct exhaust gas flow through the turbine to increase boost from the variable geometry turbocharger.

* * * * *